United States Patent [19]

Lenhardt

[11] Patent Number: 4,726,875

[45] Date of Patent: Feb. 23, 1988

[54] SPACER ON A DEVICE FOR CONNECTING TWO GLASS PLATES TO FORM AN EDGE-BONDED INSULATING-GLASS PANE

[75] Inventor: Karl Lenhardt, Neuhausen-Hamberg, Fed. Rep. of Germany

[73] Assignee: Lenhardt Maschinenbau GmbH, Neuhausen-Hamberg, Fed. Rep. of Germany

[21] Appl. No.: 925,882

[22] Filed: Oct. 31, 1986

[30] Foreign Application Priority Data

Nov. 11, 1985 [DE] Fed. Rep. of Germany ....... 3539878

[51] Int. Cl.[4] ........................ B32B 17/00; B32B 17/10

[52] U.S. Cl. .................................... 156/538; 156/107; 156/578

[58] Field of Search ............... 156/107, 109, 556, 578, 156/443, 538, 539, 558, 559

[56] References Cited

U.S. PATENT DOCUMENTS

| | | | |
|---|---|---|---|
| 3,974,011 | 8/1976 | Jarchow et al. | 156/107 |
| 3,990,570 | 11/1976 | Mercier et al. | 156/107 |
| 4,088,522 | 5/1978 | Mercier et al. | 156/107 |
| 4,434,024 | 2/1984 | Lisec | 156/556 |
| 4,617,073 | 10/1986 | Scott | 156/107 |

FOREIGN PATENT DOCUMENTS

| | | | |
|---|---|---|---|
| 2310502 | 10/1973 | Fed. Rep. of Germany . | |
| 2816437 | 8/1979 | Fed. Rep. of Germany | 156/99 |
| 3039766 | 5/1982 | Fed. Rep. of Germany | 156/107 |

*Primary Examiner*—Donald E. Czaja
*Assistant Examiner*—Lori A. Cuervo
*Attorney, Agent, or Firm*—Balogh, Osann, Kramer, Dvorak, Genova & Traub

[57] ABSTRACT

A spacer (55) on a device for connecting two glass plates (31, 32) to form an edge-bonded insulating-glass pane by injecting a strand (67) of an initially pasty and subsequently solidifying material, adhering to the two glass plates (31, 32), over the entire periphery along the edge of the pane into the gap between the two glass plates held at a distance from one another is described. The spacer (55) has two rollers (70, 71) which are arranged next to one another with axes of rotation parallel to one another and to the pane running plane (10) and at right angles to the determined direction (III) of the relative movement between the nozzle (36) and the glass plates (31, 32) and of which one (70) is intended to rest against the inner surface of one glass plate (32) and the other (71) is intended to rest against the inner surface of the other glass plate (31).

17 Claims, 6 Drawing Figures

Figures 1, 2, 3, 4, 5, 6:
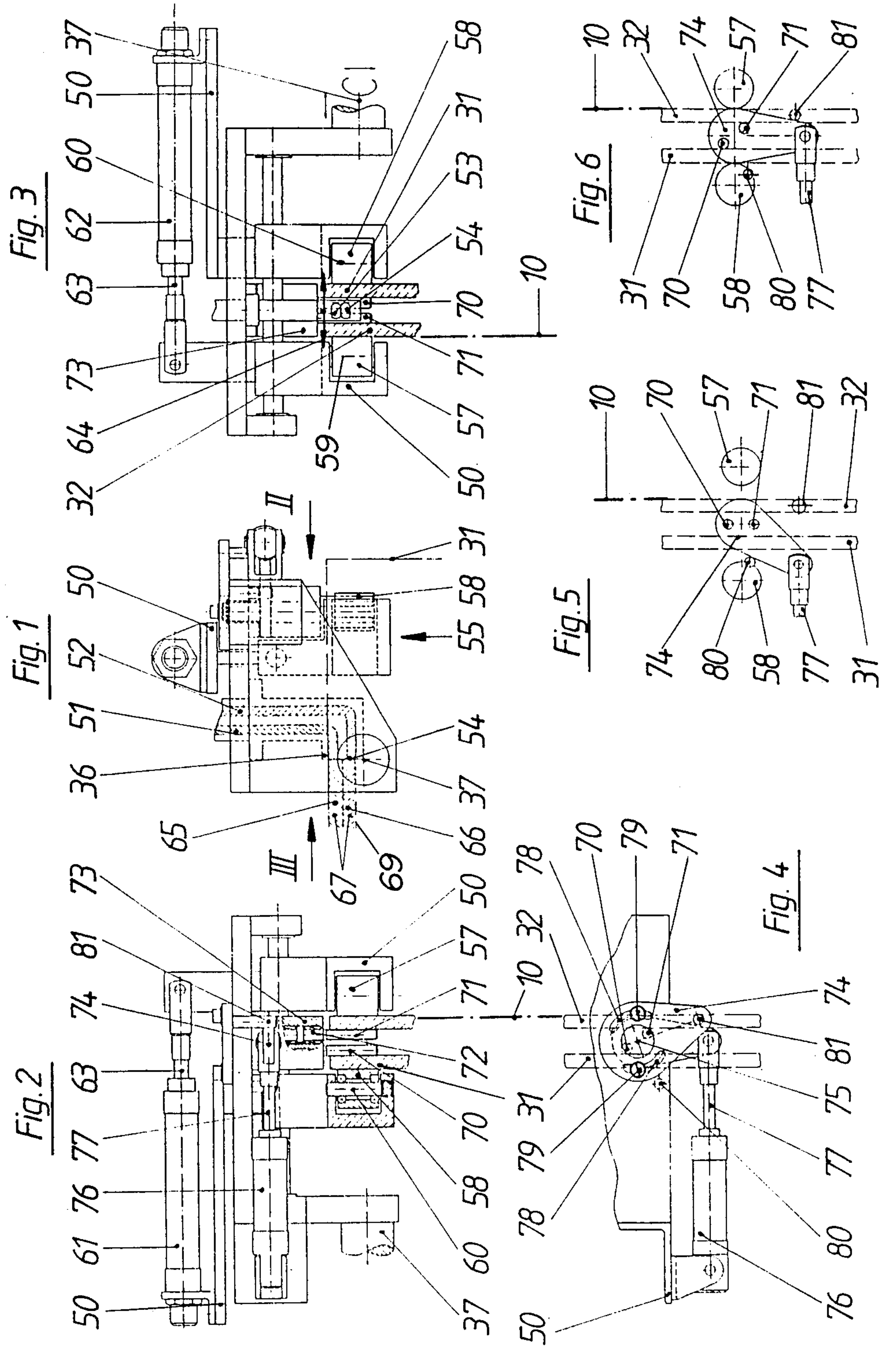

SPACER ON A DEVICE FOR CONNECTING TWO GLASS PLATES TO FORM AN EDGE-BONDED INSULATING-GLASS PANE

DESCRIPTION

The present invention relates generally to improvements in insulating-glass pane, and more particularly to a spacer on a device for connecting two glass plates to form an edge-bonded pane.

Such a device is described in the earlier, but not previously published U.S. patent application Ser. No. 897,493 or Canadian Patent Application No. 516,064 both filed on 15.08.1986.

The prior art includes a device known from German Offenlegungsschrift No. 2,310,502, in which the two glass plates to be connected are clipped together, with a spacer in the form of a yoke or bellows inserted between them, and, standing on a horizontal conveyor and leaning against a bank of supporting rollers with their lower edge, are guided past a stationary nozzle from which a hot-melt material emerges, penetrates as a strand into the gap between the two glass plates and adheres to their two edges located opposite one another. When a strand has been introduced over the full length along one edge of the pair of glass plates which have been clipped together, the forward movement of the glass plates and the supply of hot-melt material are interrupted and the pair of glass plates is then pivoted as a unit through 90° about an axis perpendicular to the pane running plane and then a strand of the hot-melt material is injected into the edge region now located at the bottom.

This operation is repeated in the same way at the third edge of the clipped-together pair of glass plates; the spacer is then removed from the gap between the two glass plates. The two glass plates, now connected solely by the hot-melt material, are rotated 90° a third time, and then the strand of hot-melt material is injected at the last edge still remaining, with the result that the gap between the two glass plates is sealed tight; they now constitute an insulating-glass pane.

In a particular embodiment of the known device, on both sides of the pane running plane there are rollers which, at the moment when the hot-melt material is injected, exert slight pressure on the outer surface of the two glass plates in order to keep the distance between them constant throughout.

A disadvantage of the known device is that, before the hot-melt material is injected, the two glass plates to be connected have to be clipped together, with a spacer inserted, and that this spacer has to be removed from the hot-melt material again in an intricate operation before the last strand is injected. It is impossible, in this way, to connect two glass plates efficiently and automatically. Another disadvantage of the known device is that the clipped-together pair of glass plates has to be rotated 90° three times. For this reason it is necessary to have a pivoting arrangement, the construction of which necessarily involves a high outlay, particularly where larger glass-plate sizes are concerned. Moreover a relatively large amount of time and space is required for pivoting the glass plates.

In contrast to this, the invention described in U.S. patent application Ser. No. 897,493 or Canadian Patent Application No. 516,064, both filed on 15.08.1986, provided an advanced device in which there is no need to rotate the glass plates and which is particularly suitable for an efficient automated connection of glass plates to form insulating-glass panes.

An essential feature of that advanced device is that the horizontal conveyor for supporting the two glass plates via one of their large surfaces has separate supporting elements, the first of which define the pane running plane, whilst the others define a plane parallel to this. The pane running plane is to be understood as meaning a plane which is parallel to the glass plates and which, during the transport of the glass plates on the horizontal conveyor, coincides with the outer large surface of one of the two glass plates, specifically the lower large surface of the lower glass plates when the glass plates are transported lying horizontally, and the rear surface of the rear glass plate in the case of a horizontal conveyor on which the glass plates are transported standing and leaning against the supporting elements.

The horizontal conveyor known from German Offenlegungsschrift No. 2,310,502 also has supporting elements for the rear large surface of the rear glass plate. However, in the known device, the front glass plate is supported by the spacer clamped firmly between the two glass plates. Instead of this clamped spacer, the advanced device uses separate supporting elements arranged on the horizontal conveyor in such a way that they define a second plane parallel to the pane running plane, with the result that they hold the second glass plate at a predetermined distance from the first glass plate lying in the pane running plane whilst the two glass plates are conveyed synchronously on the horizontal conveyor and/or are connected to one another as a result of the injection of an initially pasty and subsequently solidifying material into the gap between them. Example of suitable materials for this are hot-melt adhesives or Thiokols.

To avoid having to pivot the two glass plates for connection, in the advanced device there is a nozzle which is movable parallel to the pane running plane transversely relative to the direction of transport of the horizontal conveyor. In principle, it is possible to make do with one nozzle, but there can also be several nozzles which are used in succession or even partly simultaneously for injecting the pasty material into the gap between two glass plates. If several nozzles are provided, at least one of them is movable in the way described. If there is only one nozzle, this can be used to treat the two edges, extending transversely relative to the direction of transport, of a pair of glass plates while the glass plates are stationary; although, the two edges, extending parallel to the direction of transport, of the pairs of glass plates can also be treated running through, with the nozzle stationary. Further possible arrangements of nozzles and their cycles of movement are described in German Patent Specification No. 2,816,437 and German Patent Specification No. 2,846,785; they can be transferred to the present invention in as much as they act on insulating-glass panes which are not pivoted during treatment. In particular, it is also possible to provide two nozzles which are movable parallel to the pane running plane along two parallel paths of movement oblique relative to the direction of transport and which are pivotable about an axis perpendicular to the pane running plane, as shown in the second exemplary embodiment of German Patent Specification No. 2,816,437. The advantage of such an arrangement is that the two nozzles start work simultaneously or approximately simultaneously at a first common corner and finish it simultaneously or approximately simultaneously at the opposite corner, so that the two strands produced by them are connected to one another at both ends as long as they are still fresh (hot), with the result that a tight seal between the two strands can easily be obtained.

To allow the nozzle to pass the edge of the glass plates unimpeded in the advanced device, the supporting elements for the glass plate located at a distance from the pane running plane can be disengaged from this glass plate individually or in groups by an actuating means. In that edge region of a pair of glass plates in which the pasty material has already been injected, precisely this pasty material can provide the necessary support for the glass plate arranged at a distance from the pane running plane, instead of the supporting elements already disengaged.

The supporting elements mentioned in the earlier U.S. patent application Ser. No. 897,493 or Canadian Patent Application No. 516,064, both filed on 15.08.1986, are rollers which penetrate into the gap between the two glass plates and which roll on the inside of the glass plate arranged at a distance from the pane running plane, or, instead or such rollers, appropriately arranged pins penetrating into the gap between the two glass plates.

Furthermore, in the advanced device described in U.S. patent application Ser. No. 897,493 or Canadian Patent Application No. 516,064, both filed on 15.08.1986, there is, at a constant distance from the orifices of the nozzles and in advance of these, a spacer which penetrates into the gap between the two glass plates and keeps the two glass plates at the necessary distance from one another near the nozzle orifices, and which guarantees that the strand of pasty material injected between the glass plates has exactly the necessary width corresponding to the distance between the glass plates.

In the advanced device described in U.S. patent application Ser. No. 897,493 or Canadian Patent Application number 516,064, both filed on 15.08.1986, a sliding body is used as the spacer in advance of the nozzle and, by means of its two flanks which are preferably made of a plastic having a low coefficient of friction, rests against the two mutually facing surfaces of the glass plates and slides along on them; preferably, that spacer is chamfered to make it easier to introduce it into the gap between the two glass plates.

The object on which the present invention is based is to provide, for a device of the type mentioned in the introduction, a spacer which penetrates into the gap between two glass plates already placed at a distance from one another by further means and is in advance of a nozzle and which has reduced friction and is more easily adaptable to different distances between the glass plates.

Instead of the spacer in the form of a sliding piece, described in the earlier U.S. patent application Ser. No. 897,493 or Canadian Patent Application No. 516,064, both filed on 15.08.1986, there is, according to the invention, a spacer with two rollers which penetrate into the gap between two glass plates and of which one is intended to rest against the inner surface of one glass plate and the other is intended to rest against the inner surface of the other glass plate. By the use of such rollers which are in advance of the nozzle assigned to them during the movement of the nozzle along the edge of the glass plate and which at the same time roll on the glass plates, only slight friction occurs between the glass plates and the spacer rollers; thus, assisting a particularly uniform relative movement between the nozzle and the glass plates. A uniform movement and a constant distance between the glass plates during this movement are likewise important for producing a uniform strand of injected material which is to make the sealed bond between the two glass plates. It is unimportant here, in principle, whether during this relative movement, the glass plates are stationary and the nozzle is moved or whether the nozzle is stationary and the glass plates are moved.

Of course, the distance between the two glass plates cannot be less than the diameter of the spacer rollers. The diameter of the two rollers arranged at a distance from one another consequently determines the minimum distance which there can be between two glass plates in order to make it possible to assemble them into an insulating-glass pane in the device according to the invention. The distance between glass plates in insulating-glass panes is conventionally at least 6 mm; this means that, with rollers which have an outside diameter of 4–5 mm and which can be produced without difficulty, it is possible to provide spacers according to the invention for insulating-glass panes with all the customary distances between their glass plates.

An advantage of using two rollers for forming a spacer is that simple matching to differing distances between glass plates becomes possible. One possibility is to mount the two rollers so as to be at a variable distance from one another, in which case the variation in distance can be made either by hand after the release of a mechanical lock or by means of a motor. Another possibility for matching is to arrange the rollers on a common carrier and to mount this common carrier so as to be rotatable about an axis parallel to the axes of rotation of the rollers. In this case, it is possible to achieve infinitely variable matching of the spacer over a distance range of which the lower limit is determined by the (preferably identical) outside diameters of the rollers and the upper limit is determined by the distance between the axes of rotation of the two rollers plus the radii of the two rollers. The lower limit of the distance range is reached when the axes of rotation of the two rollers are at the same distance from the pane running plane, and the upper limit of the distance range is reached when the carrier of the two rollers is rotated 90° out of this position. In this embodiment, the spacer is appropriately of symmetrical design, that is to say the axis of rotation of the carrier is appropriately in the center between the axes of rotation of the two rollers and in the mid-plane, parallel to the pane running plane of the nozzle, the latter feature guaranteeing that, after the carrier of the two rollers has been rotated, the carrier and the nozzle do not have to be adjusted relative to one another once more.

To limit the angle of rotation of the common carrier of the two rollers, it is expedient to provide two stops, one of which is preferably a fixed stop which defines the least possible distance whereas the other stop defines the distance to be assumed between the particular glass plates to be connected; this second stop is preferably made adjustable for matching to differing distances between the glass plates. Working with these two stops makes it possible to insert the spacer very simply into the gap between the two glass plates by rotating the common carrier against the fixed stop before the spacer is introduced between the glass plates. the rollers are then at a shorter distance from one another than the glass plates, as measured at right angles to the pane running plane, and only after they have been introduced into the gap between the glass plates are the rollers brought up against the two mutually facing glass-plate surfaces by rotation of the carrier against the other stop. However, another advantage of using rollers for the spacer is that, even when the two rollers are introduced between the glass plates in a position in which they already define the desired distance between them, they can be introduced more easily than when a spacer designed as a sliding body is used.

The second stop for limiting the angle of rotation of the common carrier of the two rollers can be made adjustable by hand (after the release of a mechanical lock) or adjustable by means of a motor for matching to differing distances between the glass plates. With adjustability by means of a motor, there is the possibility of automatic matching to changing distances between the glass plates (of course, the same also applies accordingly to matching by means of rollers with a variable distance from one another).

The device described in the earlier U.S. patent application Ser. No. 897,493 or Canadian Patent Application No. 516,064, both filed on 15.08.1986, does not yet have the possibility of such a simple matching to differing distances between the glass plates. For matching to changing distances between the glass plates, the spacer has to be exchanged or it would have to be designed with flanks with a variable distance from one another.

How deep the rollers penetrate into the gap between two glass plates is a question of expediency. Preferably, the rollers have a cylindrical outer surface extending axially over a few centimeters and also correspondingly penetrate a few centimeters deep into the gap between the glass plates, as a result of which it becomes possible for the rollers to rest flush against the glass plates. Compressive forces which arise and which are exerted by pressing elements to be described below can be absorbed effectively.

The invention can be used both on devices with a horizontal conveyor on which the glass plates are transported lying horizontally and on devices with a horizontal conveyor on which the glass plates are transported standing.

However, a preferred device is one through which the glass plates run standing on a set-up conveyor leaning against the supporting elements at an angle of a few degrees relative to the vertical, since in such a design the sag of the front plate is no particular problem and the supporting surface of the device is much smaller than when the glass plates are treated lying horizontally.

When the glass plates are arranged lying horizontally or inclined, simply the weight of the upper or front glass plate located at a distance from the pane running plane can ensure that, in the region near the nozzle, the two glass plates are not at a greater distance from one another than is necessary and determined by the spacer. Preferably, however, there are on both sides of the spacer, pressing elements, especially rollers, by which the two glass plates are pressed against the spacer during the injection of the pasty material.

In the simplest case, the pressing elements can be loaded by mechanical springs. Preferably, however, this purpose is served by a pneumatic piston/cylinder unit or an actuating means acting in a similar way, which makes it possible to press the pressing elements arbitrarily against the glass plates and lift them off from these arbitrarily. In particular, such an actuating means also makes it possible to match differing thicknesses of insulating-glass panes. Since the outside of one glass plate always lies in the pane running plane even when the thicknesses of the insulating-glass panes differ, there is no need for the pressing elements, with their pressureexerting surface lying in the pane running plane, to be arranged so as to be transversely displaceable, although it can certainly be advantageous to mount them in a manner so as to be transversely displaceable to a limited extent, especially in a flexible manner. For matching to insulating-glass panes of differing thicknesses, it is sufficient if the pressing element or the pressing elements located opposite one another are displaceable transversely relative to the pane running plane. Preferably, the piston of the piston/cylinder unit is connected to the pressing element or pressing elements on one side of the pane running plane, and its cylinder is connected to the pressing element or pressing elements on the other side (overhung mounting), and appropriately only a short displacement travel is provided for the pressing elements of which the pressure-exerting surface is to lie in the pane running plane, but a longer displacement travel is provided for the opposite pressing elements.

To produce a strand of pasty material between the two glass plates, it is not always necessary to make the nozzle penetrate into the gap between the two glass plates; the device known from German Offenlegungsschrift No. 2,310,502 also shows a non-penetrating nozzle. Preferably, however, the nozzle is made to penetrate into the gap, specifically in such a way that the nozzle orifice points in the opposite direction to the relative movement of the nozzle in relation to the glass plates. An arrangement of this type is favorable for producing a uniform strand in a straight line.

If it is not intended to provide a separate nozzle for each edge for injecting the pasty material along the four edges of the glass plates, it is necessary to have at least one nozzle which is movable transversely relative to the direction of transport of the horizontal conveyor and which is rotatable at least once, preferably successively, through 90° each time about an axis perpendicular to the pane running plane, so that it can be brought up in succession against several edges of the glass plates.

The nozzle and the spacer assigned to it can be separate components, but preferably they are both arranged on a common carrier.

To obtain as simple a design of the device as possible, it is advantageous to arrange not only the nozzle and the spacer, but also, in addition to these, the pressing elements on a common carrier, so that they can be shifted and pivoted together with the latter.

An exemplary embodiment of the invention is explained in the following description of the accompanying diagrammatic drawings.

FIG. 1 shows a front view of the penetration of the spacer and of the nozzle assigned to it into the upper edge gap between two glass plates, FIG. 2 shows a partially sectional view in the direction of the arrow II in FIG. 1, FIG. 3 shows a view in the direction of the arrow III in FIG. 1, FIG. 4 shows, as a detail, a plan view of the rotatable carrier of the two rollers of the spacer and the piston/cylinder unit for actuating it, FIG. 5 shows a diagrammatic plan view of the neutral position of the rotatable carrier of the two rollers of the spacer, and FIG. 6 shows a diagrammatic plan view, corresponding to that of FIG. 5, of the rotatable carrier in a position in which the rollers of the spacer hold two glass plates at a predetermined distance from one another.

The drawings omit to show the horizontal conveyor on which the glass plates are positioned and conveyed at a distance from one another and on which the spacer according to the invention is arranged. This can be a horizontal conveyor which conveys the glass plates in an approximately vertical position, and the illustrations in the accompanying drawings are chosen with such a device in view. In principle, however, an equivalent spacer can also be used on devices where the glass plates are conveyed lying horizontally.

The spacer 55 is attached to a carrier 50 which itself can be attached to a slide mounted displaceably on the horizontal conveyor. The carrier 50 carries not only the spacer 55, but also a nozzle 36 to which the spacer 55 is assigned.

The nozzle 36 has two feed channels 51 and 52 which, converging obliquely towards one another, open into two closely adjacent elongate outflow orifices 53 and 54 parallel to one another which point in the opposite direction to the direction of movement (arrow III) of the nozzle in relation to the two glass plates 31 and 32 to be held at a distance from one another. Different pasty materials can be supplied through the two feed channels 51 and 52 and, at the nozzle outlet, combine to form a composite strand 67 comprising two layers 65 and 66. The interface between the two layers 65 and 66 extends transversely relative to the pane running plane 10 from one glass plate 31 to the other glass plate 32. The pane running plane 10 coincides with the outside of one glass plate 32 and is defined, for example, by a supporting wall or a bank of supporting rollers of the horizontal conveyor.

The nozzle 36 is made a little narrower than the predetermined distance between the two glass plates 31 and 32, so that the nozzle can penetrate into the gap between the glass plates 31 and 32. To ensure that the two glass plates exactly maintain the predetermined distance from one another in the region of the nozzle, the spacer 55 is provided in advance of the nozzle orifices 53 and 54 and, in the example illustrated, this comprises two identical cylindrical rollers 70 and 71 which are arranged with their axes of rotation parallel to one another and which, at one end, have journals 72, by means of which they are mounted freely rotatably in a common bearing body 73.

The bearing body 73 is fastened to a disk-shaped carrier 74 which is fastened to the carrier 50 so as to be rotatable about an axis 75 parallel to the axes of rotation of the rollers 70 and 71. For this purpose, there is a pressure-medium cylinder 76 which is articulated on the carrier 50 by means of its rear end and the piston rod 77 of which is articulated on the rotatable carrier 74 by means of its front end. Arranged concentrically relative to the axis 75 in the carrier 74 are two arcuate slots 78, through which are guided two retaining screws 79 which are screwed into the carrier 50 and which retain and guide the rotatable carrier 74 on the carrier 50. To limit the angle of rotation of the carrier 74, on the carrier 50 there are two stops 80 and 81, against which the rotatable carrier 74 butts in its two end positions. One stop 80 is arranged fixedly, and when the rotatable carrier 74 rests against it (FIG. 5) the two rollers 70 and 71 are at the same distance from the pane running plane 10; this position is also called the neutral position, and it determines the least possible distance which there can be between the two glass plates 31 and 32. The other stop is arranged adjustably on the carrier 50 and allows matching to differing distances between the glass plates 31 and 32. When the rotatable carrier 74 butts against the second stop 81 (FIG. 6), the two rollers are in a position in which they define the predetermined desired distance between the two glass plates 31 and 32. The pressure-medium cylinder 76 therefore serves only to rotate the carrier 74 between the two end positions which are shown in FIGS. 5 and 6 and of which one defines the inactive position of the rollers 70 and 71 (FIG. 5) whilst the other end position defines the position of the rollers 70 and 71 in which a strand 67 of pasty material can be injected between the two glass plates (FIG. 6).

In order to introduce the spacer 55 into the gap between the two glass plates 31 and 32, the rollers 70 and 71 of the spacer are always brought into their neutral position, so that there is no problem at all in introducing it. Only when the rollers are located between the two glass plates is the rotatable carrier 74 rotated by actuating the pressure-medium cylinder 76, until the carrier 74 comes up against the stop 81.

On both sides of the spacer 55 there are two free-running pressure rollers 57 and 58, the axes of rotation 59 and 60 of which are arranged parallel to the pane running plane 10. These pressure rollers 57 and 58 press the two glass plates 31 and 32 against the spacer 55 and thereby ensure the predetermined distance between them, so that the composite strand 68 can be produced in the required width corresponding to this distance.

So that the pressure rollers 57 and 58 can be moved towards the glass plates and away from them, they are mounted, so as to be displaceable in a direction perpendicular to the pane running plane 10, in a carrier 50 which surrounds the edge of the pair of glass plates 31, 32 in the manner of a yoke. Since the rear glass plate 32 always has a constant position, determined by the pane running plane 10, in a horizontal conveyor on which the nozzle 36 is arranged, only a very short displacement travel of perhaps only 0.5 mm is required for the pressure roller 57 mounted behind the pane running plane 10. For the opposite pressure roller 58, a longer displacement travel is provided for matching to insulating-glass panes of differing thicknesses. The axles 59 and 60 of the two pressure rollers are connected to one another by means of a pneumatic piston/cylinder unit, for example in such a way that the piston rod 63 is connected to the axle 59 of the rear pressure roller and the cylinder 62 is connected to the axle 60 of the front pressure roller. Consequently, the two pressure rollers 57 and 58 are jointly actuated by the piston/cylinder unit connected to them in an overhung mounting. Before the nozzle penetrates into the gap between the two glass plates 31 and 32, the pressure rollers 57 and 58 are at their maximum distance from one another, and after penetration they are pressed pneumatically against the two glass plates.

When the nozzle 36 is moved round the corners of the glass plates 31, 32, the nozzle body only slides partially out of the gap between the two glass plates; the nozzle portion, in which the outflow orifices 53 and 54 are located, remains between the glass plates. The nozzle is pivotable about an axis 37 extending perpendicularly relative to the pane running direction 10 and located near that outflow orifice 54 which penetrates deepest into the gap between the two glass plates 31 and 32. Moreover, the position of the axis of rotation 37 is selected so that it is approximately in line with that surface 69 of the resulting composite strand 67 which faces the inside of the pane; the nozzle 36 is pivoted out of a position in which the axis 37 is at the same distance from the two adjacent edges of the glass plates 31 and 32; this guarantees that the best possible formation of the composite strand 67 is obtained in the corner region of the insulating-glass pane.

The spacer 55, when it approaches a corner of the pane, slides out of the gap between the two glass plates 31 and 32; consequently, whenever the nozzle 36 pivots, the pressure rollers 57 and 58 are first moved away from one another and are moved towards one another again after pivoting, in order to press the glass plates 31 and 32 against the spacer 55 once again, and the rollers 70, 71 of the spacer are first pivoted into their neutral position (FIG. 5) and, after the nozzle 36 has been pivoted and has penetrated into the gap between the glass plates 31, 32, are pivoted into their effective position (FIG. 6) once more.

I claim:

1. A spacer on a device for connecting two glass plates to form an edge-bonded insulating-glass pane by arranging the two glass plates spaced apart in parallel relationship so as to form a gap therebetween, injecting a strand of initially pasty and subsequently solidifying adhesive material adhering to the two glass plates, over the entire periphery along the pane edge into the gap between the two glass plates which glass plates are supported via at least one of their large faces and held at a distance from one another so as to be congruent with and parallel to one another, the device for connecting two glass plates comprising a horizontal conveyor for the two glass plates held at a distance from one another, which conveyor defines a pane running plane constant for one of the two glass plates and on which conveyor is arranged at least one nozzle which penetrates into the gap between the two glass plates and to which nozzle the spacer penetrating into the gap between the two glass plates is assigned at a constant distance relative to said nozzle and in advance in relation to the movement of the nozzle relative to the two glass plates, the spacer being defined in that it has two rollers which are arranged next to one another with axes of rotation extending parallel to one another and to the pane running plane and at right angles to a predetermined direction of the relative movement between the nozzle and the glass plates and of which rollers one is intended to rest against the inner surface of one glass plate and the other is intended to rest against the inner surface of the other glass plate.

2. A spacer as claimed in claim 1, wherein the rollers are mounted so as to be at a variable distance from one another.

3. A spacer as claimed in claim 1, wherein the rollers are mounted on a common carrier.

4. A spacer as claimed in claim 3, wherein the common carrier is rotatable about an axis parallel to the axes of rotation of the rollers.

5. A spacer as claimed in claim 4, wherein the axis of rotation of the carrier is in the center between the axes of rotation of the two rollers and in the mid-plane of the nozzle parallel to the pane running plane.

6. A spacer as claimed in claim 4, wherein two stops are provided in order to limit the angle of rotation of the common carrier of the two rollers.

7. A spacer as claimed in claim 6, wherein one stop is a fixed stop which takes effect when the axes of rotation of the two rollers are at the same distance from the pane running plane, and wherein the other stop is adjustable for matching to differing distances between the glass plates.

8. A spacer as claimed in claim 1, wherein the rollers have the same outside diameter.

9. A spacer as claimed in claim 1, wherein the rollers have a cylindrical running surface.

10. A device as claimed in claim 1, wherein pressing elements, especially two further rollers are provided on both sides of the spacer.

11. A device as claimed in claim 10, wherein the pressing elements can be moved towards one another and away from one another by means of a pneumatic piston/cylinder unit.

12. A device as claimed in claim 11, wherein the piston of the piston/cylinder unit is connected to the pressing element or pressing elements on one side of the pane running plane, and a cylinder of the piston/cylinder unit is connected to the pressing element or pressing elements on the other side.

13. A device as claimed in claim 1, wherein outflow orifice means of the nozzle penetrating into the gap between the two glass plates point in the opposite direction to the movement of the nozzle in relation to the glass plates.

14. A device as claimed in claim 1, wherein the nozzle and the spacer in advance of the nozzle are arranged on a common carrier.

15. A device as claimed in claim 14, wherein the nozzle and the spacer and the pressing elements, if appropriate arranged with them on a common carrier can be shifted and pivoted with the common carrier.

16. A device as claimed in claim 10, wherein the nozzle, the spacer and the pressing elements are arranged on a common carrier and can be shifted and pivoted with the common carrier.

17. A device as claimed in claim 10, wherein the pressing elements are two further rollers.

* * * * *